United States Patent [19] [11] Patent Number: 4,789,861
Baggett et al. [45] Date of Patent: Dec. 6, 1988

[54] METHOD AND APPARATUS FOR DETECTING AN OUT OF BEAM CONDITION IN A MONOPULSE RADAR RECEIVER

[75] Inventors: Don W. Baggett, Torrance, Calif.; Jay G. Herther, Nashua, N.H.; Deborah E. Bassham, San Diego, Calif.

[73] Assignee: Hughes Aircraft Company, Los Angeles, Calif.

[21] Appl. No.: 12,412

[22] Filed: Feb. 9, 1987

[51] Int. Cl.$^4$ ................................. G01S 13/44
[52] U.S. Cl. ................................. 342/152
[58] Field of Search ..................... 342/149, 152

[56] References Cited

U.S. PATENT DOCUMENTS 3,969,726 7/1976 Birleson ........................ 342/152
4,139,850 2/1979 Charlot et al. ................. 342/152
4,689,623 8/1987 Schwab et al. ................. 342/152 X

FOREIGN PATENT DOCUMENTS

0894618 4/1962 United Kingdom ............... 342/152

Primary Examiner—T. H. Tubbesing
Assistant Examiner—Gilberto Barrón, Jr.
Attorney, Agent, or Firm—Steven M. Mitchell; A. W. Karambelas

[57] ABSTRACT

There are derived from the sum and difference signals of a monopulse radar receiver a pair of signatures that quickly and reliably, e.g., unambiguously, indicates when a target being tracked moves out of the center of the antenna main beam. The sum and difference signals are combined in phase quadrature to form a first vector signature signal. The sum and difference signals are also combined in phase quadrature to form a second vector signature signal so that the phase difference between the signature signals varies with the amplitude of the difference signal. The first and second signatures are compared to detect the phase difference therebetween. Commutated signatures are used to determine the direction of target displacement from the antenna boresight and/or to verify the accuracy of the out of beam indication.

23 Claims, 6 Drawing Sheets

METHOD AND APPARATUS FOR DETECTING AN OUT OF BEAM CONDITION IN A MONOPULSE RADAR RECEIVER

BACKGROUND OF THE INVENTION

1. Field of the Invention

This invention relates generally to radar systems, and more particularly to the detection of an out of beam condition in a monopulse radar receiver.

2. Description of Related Art

In a monopulse radar receiver, sum and difference signals are formed from plural antenna beams. The difference signal is representative of the tracking error, i.e., the angle that the target being tracked is off the boresight line of the antenna and is therefore used for automatic tracking. In some radar systems, usually those employing a single target track mode, a search scan operation precedes the automatic tracking mode. After target acquisition, the search scan mode is stopped and the antenna is trained on the target by the automatic tracking equipment. Other radar systems employ a "track while scan" mode of operation, in which the position of one or more targets is continually tracked on the basis of the data received while the antenna is also performing a search scan. It is necessary that the equipment be able to detect when a target being tracked is out of the beam of the antenna, so that the track can be deleted, in a track while scan system, or the target reacquired by switching to the scanning mode, in a search and track radar.

Current techniques for detecting an out of beam condition are based upon the signal to noise ratio of the radar return signal and do not permit the direction of the target from the boresight to be ascertained. Signal to noise ratio is an ambiguous indicator of an out of beam condition. The signal to noise ratio may drop due to other factors such as ground clutter, noise, jamming or changes in atmospheric condition. To minimize the likelihood of an ambiguity, the signal to noise ratio must be monitored for a long time before a reliable out of beam determination can be made.

SUMMARY OF THE INVENTION

According to the invention, there are derived from the sum and difference signals of a monopulse radar receiver a pair of signatures that quickly and reliably, i.e., unambiguously, indicates when a target being tracked moves out of the center of the antenna main beam. Specifically, sum and difference signals are formed from a target return signal. The sum and difference signals are combined in phase quadrature to form a first vector signature signal. The sum and difference signals are also combined in phase quadrature to form a second vector signature signal so that the phase difference between the signature signals varies with the amplitude of the difference signal. The first and second signatures are compared to detect the phase difference therebetween. When the target is out of beam, this phase difference is close to a nearly constant value, i.e., +90°. Within the center of the main beam, this phase difference varies over a range of other values, e.g. between −180° and 0°.

A feature of the invention is the use of commutated signatures to determine the direction of target displacement from the antenna boresight and/or to verify the accuracy of the out of beam indication. Specifically, the phase difference between the commutated signatures approaches the constant value, i.e. +90°, from one direction, i.e., from +180°, on one side of the antenna boresight and from the other direction, i.e., 0°, on the other side of the boresight. Thus, the direction of target displacement from the boresight is determined by observing the direction of approach of the phase difference to the +90° constant value. Moreover, the phase difference between the signatures and the phase difference between the commutated signatures lie on opposite sides of and are symmetrical about the constant value, i.e., +90° line.

BRIEF DESCRIPTION OF THE DRAWINGS

The features of a specific embodiment of the best mode contemplated of carrying out the invention are illustrated in the drawings, in which.

DESCRIPTION OF THE PREFERRED EMBODIMENTS

Figure 1:
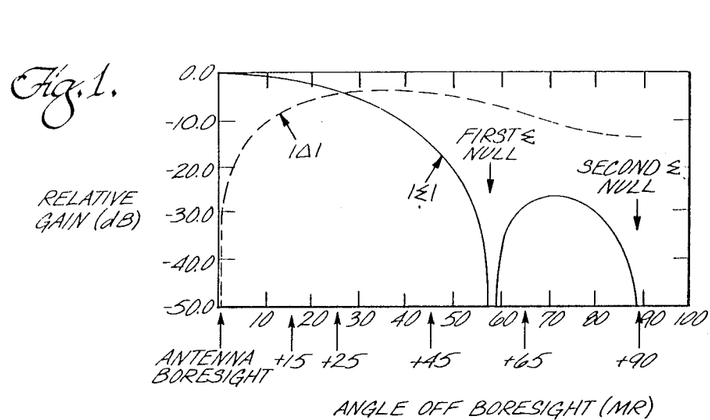
FIG. 1 is a diagram of the sum and difference signals as a function of angle-off antenna boresight.

In FIG. 1, the solid line depicts the absolute value of the sum signal, $\Sigma$, as a function of angle-off-boresight in milliradians (MR) and the dashed line represents the absolute value of the difference signal, $\Delta$, as a function of angle-off-boresight in milliradians (MR). The solid line also represents the relative gain characteristic of the antenna. As depicted, the absolute value of the difference signal is greater than the absolute value of the sum signal in the antenna sidelobes associated with the cardinal plane. The complex values of the sum and difference signals are used to generate vector signatures that are compared in phase to determine an out of beam condition—specifically, a vector signature $T_1 = \Sigma + j\Delta$ and a vector signature $T_2 = \Delta + j\Sigma$.

Figure 2:
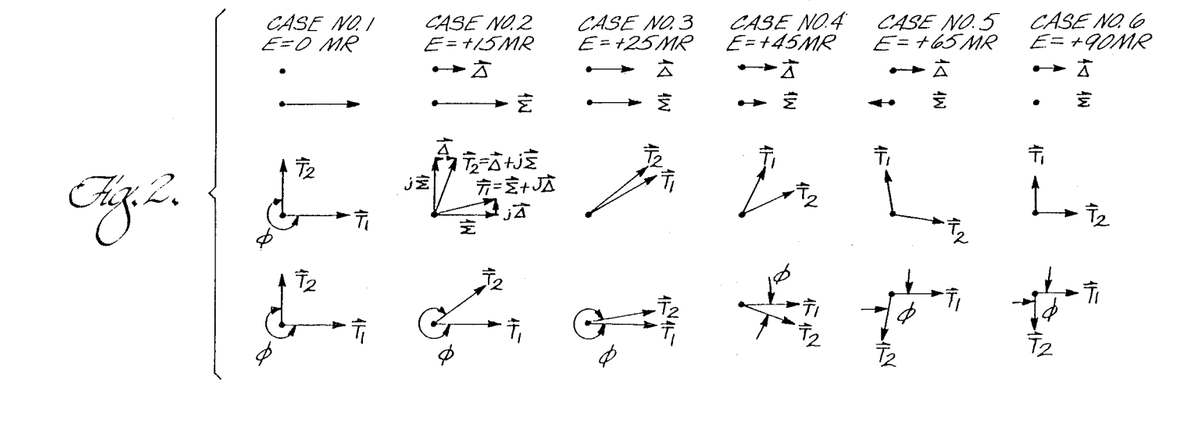
FIG. 2 is a series of vector diagrams illustrating the signatures used by the invention at different angles off boresight.

FIG. 2 illustrates vector signatures $T_1$ and $T_2$ for six cases. In each case, at the top are represented the sum and difference signals, in the middle are represented the vector signatures including their phase relationship, and at the bottom are represented the vector signatures rotated with vector signature $T_1$ as a common reference. Case 1 is at the antenna boresight, the difference signal approaches zero and the vector signatures which are each comprised solely of the sum signal, are −90° apart. Case 2 illustrates how the vector signatures are constructed from the sum and difference signals by vector addition. Cases 2, 3 and 4 illustrate the vector signatures within the main beam of the antenna. Cases 5 and 6 illustrate the vector signatures outside the center of the main beam; in these cases, the phase difference between the vector signatures is close to 90° because the difference signal is larger than the sum signal (much larger in cases 5 and 6).

It should be noted that the vector signatures compared in phase to determine an out of beam condition could be made up of other related combinations of the sum and difference signals, specifically the following:

$$T_1 = \Sigma - j\Delta;\ T_2 = -\Delta + j\Sigma \quad (1)$$

$$T_1 = -\Sigma + j\Delta;\ T_2 = \Delta - j\Sigma \quad (2)$$

$$T_1 = -\Sigma - j\Delta;\ T_2 = \Delta - j\Sigma \quad (3)$$

In each case, the phase difference between the signatures $T_1$ and $T_2$, varies with the amplitude of the difference signal vis-a-vis the sum signal. Since the difference signal predominates over the sum signal in the out of beam condition, a comparison of the signatures yields a quick, reliable indication thereof. A drop in the received signal due to the other factors such as eclipsing affects the signatures as well.

Figure 3:
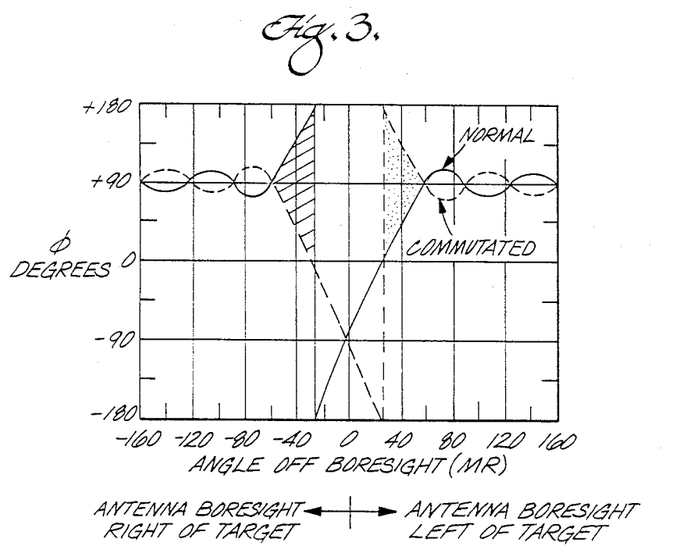
FIG. 3 is a diagram of the phase difference between the signatures used by the invention and the phase difference between the commutated signatures used by the invention.

In FIG. 3, the solid line represents the phase difference between vector signatures $T_1 = \Sigma + j\Delta$ and $T_2 = \Delta + j\Sigma$ as a function of angle-off-boresight and the dashed line represents the phase difference between the commutated vector signatures $T_1' = \Sigma - j\Delta$ and $T_2' = -\Delta + j\Sigma$. As depicted, both phase differences swing about +90° outside the center of the main beam on opposite sides of the +90° line in symmetrical fashion. Within the center of the main beam, both phase differences vary from 0°1 to −180°.

Figure 4:
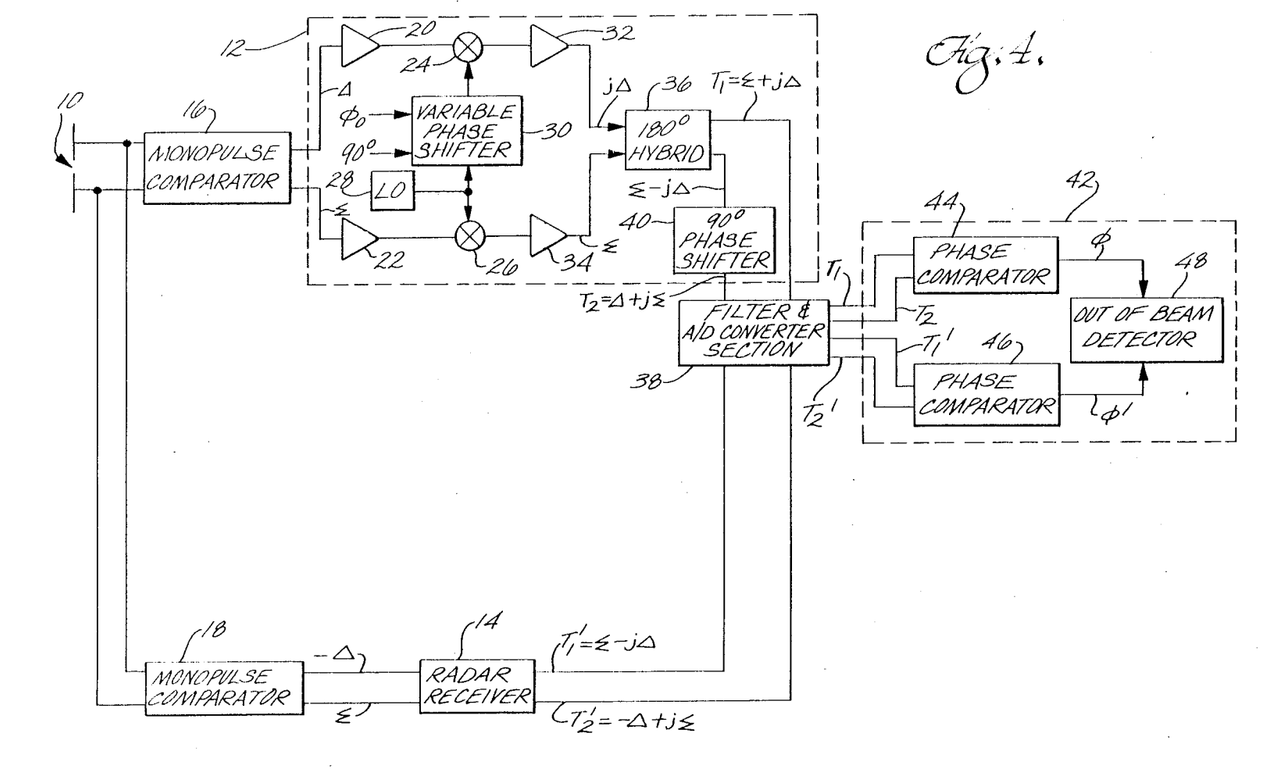
FIG. 4 is a schematic diagram of apparatus for practicing the invention.

Reference is made to FIG. 4 for apparatus to practice the invention. An antenna 10 which is segmented for reception purposes into two halves for each plane, i.e., azimuth and elevation, intercepts a target return signal. Antenna 10 is preferably a two dimensional array having slotted elements and a tapered radiation pattern. For simplicity, the following description only treats one plane, i.e., azimuth. The same procedure is followed with respect to the other palne, i.e., elevation. The signal intercepted by antenna 10 is processed by identical radar receivers 12 and 14. Receiver 12 is designed to process a sum signal, $\Sigma$, and a difference signal, $+\Delta$, received from a conventional monopulse comparator 16. Receiver 14 is designed to process a sum signal, $\Sigma$, and a difference signal, $-\Delta$, received from a conventional monopulse comparator 18. Monopulse comparator 18 rotates the difference signal 180°. (In practice, a single radar receiver would be used in time multiplexed fashion to process the outputs of both comparators 16 and 18.)

Receiver 12 has an RF section comprising preamplifiers 20 and 22, mixers 24 and 26, a local oscillator 28 and a variable phase shifter 30 and an IF section comprising postamplifiers 32 and 34 and a 180° hybrid combiner 36. The difference signal from monopulse comparator 16 is amplified by preamplifier 20 and beat down to IF in mixer 24 by the phase shifted output of local oscillator 28. The IF output from mixer 24 is amplifed by postamplifier 32 and applied to hybrid combiner 36. Similarly, the sum signal is amplified by preamplifier 22 and beat down to IF in mixer 26 by the unphase-shifted output of local oscillator 28. The IF output from mixer 26 is amplified by postamplifier 34 and applied to hybrid combiner 36. Variable phase shifter 30 is preferably electronically controllable and programmed by means of a plurality of inputs which control the phase of the output signals provided thereby. Typically, the initial phase provided by phase shifter 30 matches the differential phase delay associated with the sum and difference signals from monopulse comparator 16. Hence, the phase difference between channels is zero degrees. The remaining input of phase shifter 30 is chosen to apply a 90° phase shift to the output of local oscillator 28 used to beat down the difference signal, thereby phase shifting the difference signal relative to the sum signal. The hybrid combiner produces as one output signal, the additive combination of the signals applied thereto, which is coupled to an analog filtering and analog-to-digital conversion section 38. Hybrid combiner 36 produces as the other output signal, a subtractive combination of the signals applied thereto, which is coupled through a 90° phase shifter 40 to section 38. These are the output signals from receiver 12 representing vector signatures $T_1$ and $T_2$ in analog form.

Radar receiver 14 is identical to receiver 12 and uses a local oscillator synchronized to oscillator 28. (For further details about the apparatus of FIG. 4, reference is made to Diamond U.S. Pat. No. 4,568,940, which issued Feb. 4, 1986, the disclosure of which is incorporated herein by reference.) Because of the phase rotation of the difference signal produced by monopulse comparator 18, radar receiver 14 produces output signals representing the analog commutated vector signatures $T_1'$ and $T_2'$, which are also coupled to section 38.

The filtered, digital signature representative signals produced by section 38 are coupled to a digital computer 42. As depicted, computer 42 is configured to function as phase comparators 44 and 46 and an out of beam detector 48. Phase comparator 44 produces a signal representative of the phase difference $\phi$ between vector signatures $T_1$ and $T_2$. Phase comparator 46 produces a signal representative of the phase difference $\phi'$ between the commutated vector signatures $T_1'$ and $T_2'$. On the basis of these phase difference signals, out of beam detector 48 uses three criteria described below to determine when the target is out of beam, and the direction of displacement from boresight.

Figure 5A:
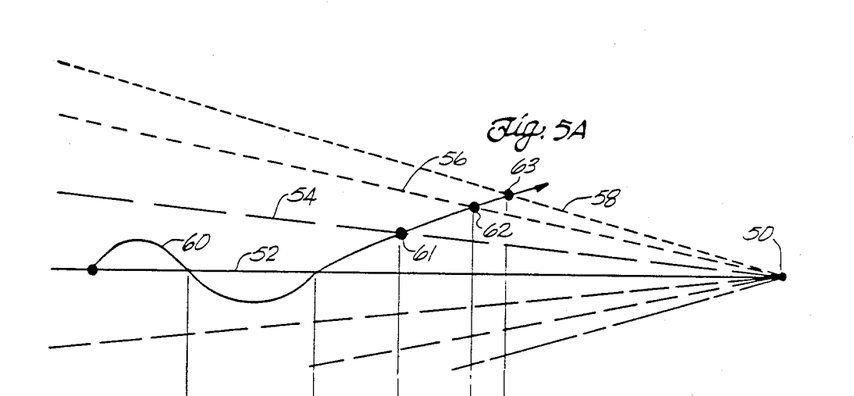
FIGS. 5(a)-(c) and 6(a)-(c) are diagrams illustrating the technique for determining the direction of target displacement off boresight.
Figure 5B:
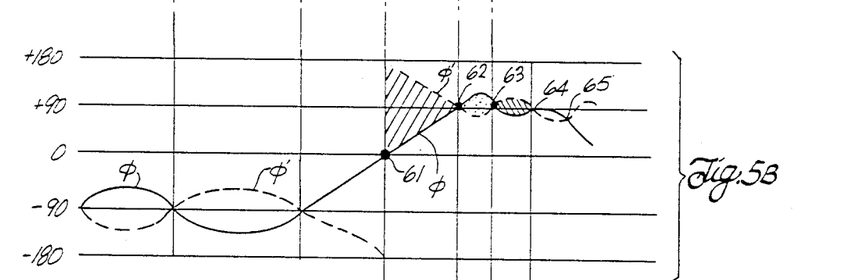

In FIG. 5A, a point 50 represents the antenna, a solid line 52 represents the boresight of the antenna main beam, and a dashed line 54 represents the point where $\Sigma$ and $\Delta$ signals are equal in magnitude. A dashed line 56 represents the null between the main lobe and the first sidelobe, a dashed line 58 represents the null between the first sidelobe and the second sidelobe, and a solid line 60 represents a target path relative to the antenna radiation pattern as a function of time. In FIG. 5B, the solid line represents the phase difference $\phi$, between signatures $T_1$ and $T_2$ as a function of time and the dashed line represents the phase difference $\phi'$ between commutated signatures $T_1'$ and $T_2'$ as a function of time for the target path illustrated in FIG. 5A. As illustrated, while the target moves within the center of the main beam from one side of the boresight to the other, the phase differences $\phi$, and $\phi'$ also swing back and forth about −90°. when the target moves out of the center of the main beam, as depicted at point 61 in FIG. 5A, phase difference $\phi$, passes through zero degrees on the way to +90°, and swings about this value. Similarly, phase difference $\phi'$, passes through +180° on the way to +90° and then swings about this value. In FIG. 5A, the target continues to move away from the boresight, crossing into the sidelobe at points 62 and 63. Points 62 and 63 are also represented in FIG. 5B.

To yield a valid indication of an out of beam condition, the phase differences $\phi$, $\phi'$, should meet the following criteria:

(1) Be close to $+90°$;
(2) Lie on opposite sides of $+90°$;
(3) Exhibit symmetry about $+90°$.

If these three tests are not met, either the target is not out of beam or the return signal strength is too weak to determine whether or not the target is out of beam.

As shown in FIG. 5B, the phase differences meet all three criteria between points 61 and 62, between points 62 and 63, and between points 63 and 64, thus the target is out of beam. Within the center of the main beam, i.e., to the left of point 61 in FIG. 5B, the phase differences fail the first criterion, namely that they lie close to the constant angle, i.e. $+90°$. Between points 64 and 65, the phase differences fail the second criterion, namely that they lie on opposite sides of the constant angle, i.e. $+90°$. To the right of point 65, the phase differences fail the third criterion, namely that they be symmetrical about the constant angle, i.e. $+90°$. In the latter two cases, the signal is too weak to provide a valid indication of the target position relative to the beam.

Figure 5C:
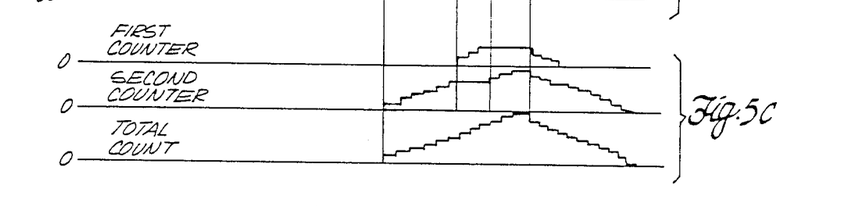

First and second counters, not shown, in detector 48 are incremented and decremented in response to the phase difference signals. Specifically, while the above criteria are being met, either the first counter or the second counter, but not both, is incremented depending upon which phase difference signal is larger. The first counter is incremented when difference signal $\phi$ is larger, and the second counter is incremented when difference signal $\phi'$ is larger; both counters are decremented when any one of the criteria is not met. As illustrated, the second counter begins to count before the first counter because phase difference $\phi'$ is larger than phase difference $\phi$ between points 61 and 62.

Figure 6A:
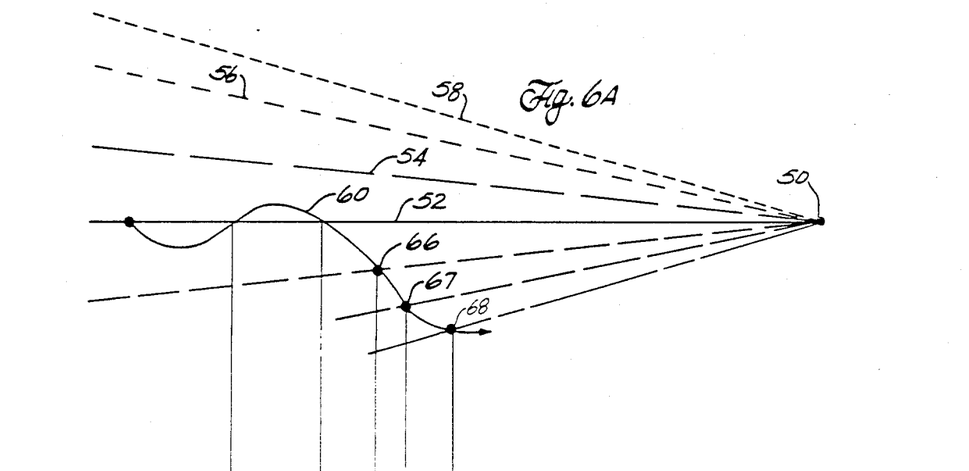
Figures 6B, 6C:
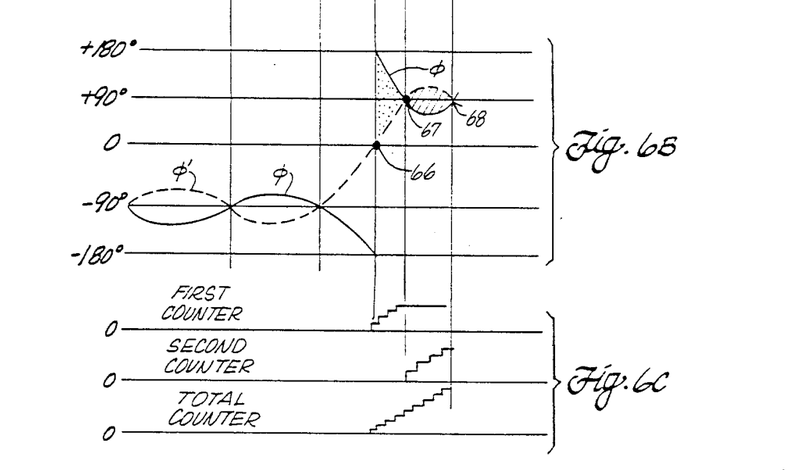

Using the same reference numerals as FIG. 5A, FIG. 6A represents the antenna pattern and the target moving out of beam in the opposite direction. As illustrated in FIG. 6B, in this case the situation is reversed when the target moves out of the center of the main beam as represented at point 66. Specifically, phase difference signal $\phi'$ passes through zero degrees on the way to $+90°$ and phase difference $\phi$ passes through $-180°$ on the way to $+90°$. As depicted in FIG. 6C, in this case the first counter begins to count before the second counter, because phase difference $\phi$ is larger than phase difference $\phi'$ between points 66 and 67, and the second counter counts between points 67 and 68.

A comparison of FIGS. 5 and 6 illustrates how detector 48 determines when a valid out of beam condition has been indicated and the direction of the target vis-a-vis the boresight. An increasing total count in the first and second counters indicates that the target is out of beam; a decreasing total count indicates either that the target is in the center of the main beam or the returned signal strength is too weak to give a reliable indication of the target location vis-a-vis the main beam. If the target is out of beam, as indicated by an increasing total count, the target is on one side of the boresight when the first counter starts incrementing before the second counter and is on the other side of the boresight when the second counter begins incrementing before the first counter.

Figure 7:
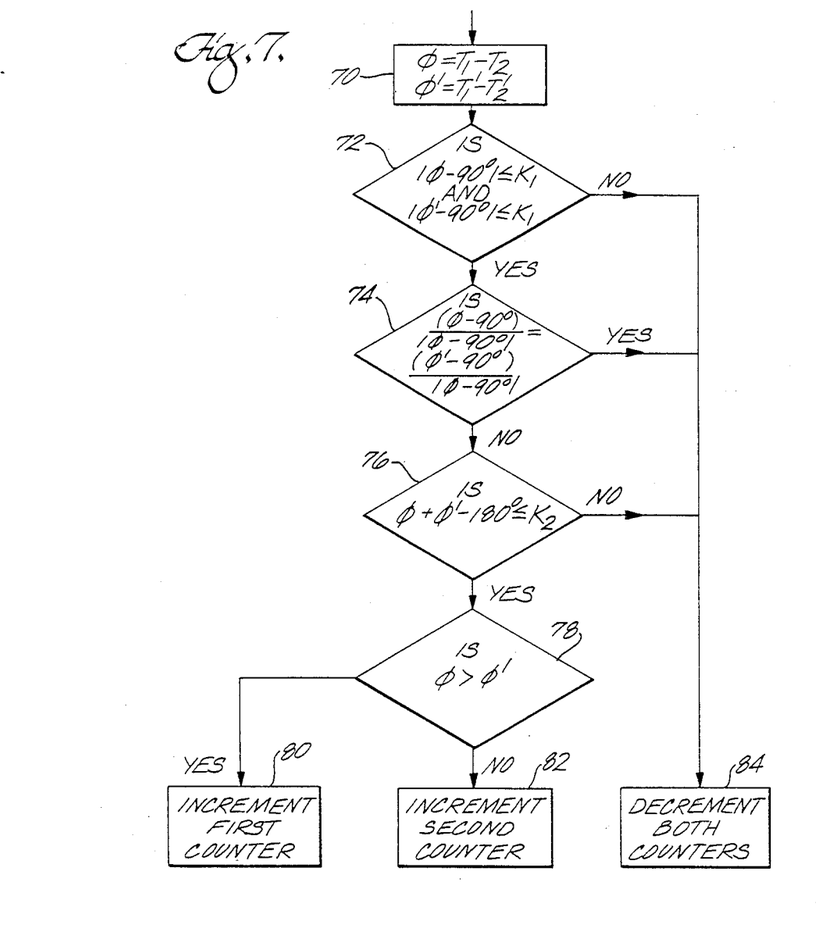
FIG. 7 is a flow diagram of an algorithm for determining the out of beam indication and the direction of target displacement off boresight.

FIG. 7 is a flow diagram of the algorithm for controlling the first and second counters. This algorithm can be implemented by a computer program in a straightforward manner by one of ordinary skill using well known programming techniques. Block 70 represents the phase differences. Block 72 represents the first criterion—whether or not both phase differences are close to the constant angle, i.e. $+90°$. $K_1$ is the value of a predetermined threshold within which the criterion is deemed to be met, preferably of the order of $10°$. If this criterion is not met, both counters are decremented as represented by a block 84. If this criterion is met, then the phase differences are tested for the second criterion. As represented by block 74, in this criterion the phase differences from $+90°$ are examined to determine if the signs are equal. If they are equal, the second criterion, phase differences lying on opposite sides of $+90°$ is not met and both counters are again decremented. If the phase differences have opposite signs, then they are examined for the third criterion. As represented by block 76, the third criterion is met if the sum of the phase differences varies from $180°$ by less than the value of a predetermined threshold $K_2$. This means that the phase differences are symmetrical about $+90°$ to within the threshold. If the phase differences fail this test, both counters are decremented. Otherwise, these phase differences are compared to determine which is larger as represented by block 78. If phase difference $\phi$ is larger than phase difference $\phi'$, then the first counter is incremented as represented by block 80; if the opposite, then the second counter is incremented as represented by block 82.

In the described manner, the invention permits a quick and reliable determination of when a target being tracked is out of beam and the direction of the target vis-a-vis the boresight.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, if knowledge of the direction of the out of beam target vis-a-vis the boresight is not required, then it is not necessary to generate the commutated signatures. Further, as indicated above, both normal and cummutated signatures could be generated with the same receiver employing time multiplexing techniques rather than with separate receivers, as disclosed. Moreover, different signatures than those disclosed could be employed, such as, for example, (a) $T_1 = \Sigma + j\Delta$; $T_2 = \Sigma - j\Delta$ or (b) $T_1 = \Sigma + \Delta$; $T_2 = \Sigma - \Delta$. In both of these cases, the phase difference between signatures also varies with the amplitude of the difference signal, vis-a-vis the sum signal, being close to $0°$ in the main beam and close to $180°$ outside the main beam. Further, although it is preferred to employ out of beam detector 48, the phase differences could be evaluated by a human operator observing a display of the phase differences, which is driven by phase comparators 44 and 46. In such case, the patterns, depicted in FIGS. 5B and 6B would in essence appear on the display for evaluation by the operator.

What is claimed is:

1. A method for detecting an out of beam condition in a monopulse radar receiver comprising the steps of:
   forming sum and difference signals from a target return signal;
   combining the sum and difference signals to form a first vector signature signal;
   combining the sum and difference signals to form a second vector signature signal so that the phase difference between the first and second signature signals varies with the amplitude of the difference signal;

comparing the first and second signature signals to detect the phase difference therebetween;

combining the sum and difference signals to form a third vector signature signal in which the difference signal is of opposite phase to the difference signal of the first signature signal;

combining the sum and difference signals to form a fourth vector signature signal in which the difference signal is of opposite phase to the difference signal of the second signature signal, the phase difference between the third and fourth signature signals varying with the amplitude of the difference signal; and comparing the third and fourth signature signals to detect the phase difference therebetween.

2. The method of claim 1 in which the signature signals re each formed by combining the sum and difference signals in phase quadrature.

3. The method of claim 1, in which the sum and difference signals of the first signature are both in phase with the difference and sum signals, respectively, of the second signature, the method additionally comprising the step of:

monitoring the phase difference between the first and second signatures and the phase difference between the third and fourth signatures.

4. The method of claim 3, in which the monitoring step comprises determining whether or not each phase difference is within a predetermined first threshold of a constant angle.

5. The method of claim 4, in which the monitoring step additionally comprises determining whether or not one phase difference minus the constant angle equals the other phase difference minus the constant angle.

6. The method of claim 5, in which the monitoring step additionally comprises determining whether the sum of the phase differences is within a predetermined second threshold of twice the constant angle.

7. The method of claim 6, in which the monitoring step additionally comprises determining whether the phase difference between the first and second signatures is greater than the phase difference between the third and fourth signatures.

8. The method of claim 3, additionally comprising the steps of:

incrementing a first counter periodically while the phase difference between the first and second signatures is greater than the phase difference between the third and fourth signatures, and incrementing a second counter periodically while the phase difference between the first and second signatures is not greater than the phase difference between the third and fourth signatures.

9. The method of claim 8, additionally comprising the step of decrementing both counters when it is determined that (a) the phase difference between the first and second signatures or the phase difference between the third and fourth signatures is not within a predetermined first threshold of a constant angle; (b) the phase difference between the first and second signatures minus the constant value equals the phase difference between the third and fourth signatures minus a constant value; or (c) the sum of the phase differences minus twice the constant angle is not within a predetermined second threshold.

10. The method of claim 8, additionally comprising the step of decrementing both counters when it is determined that the phase difference between the first and second signatures and the phase difference between the third and fourth signatures are not within a predetermined first threshold.

11. The method of claim 8, additionally comprising the step of decrementing both counters when it is determined that the phase difference between the first and second signatures minus a constant value equals the phase difference between the third and fourth signatures minus a constant value.

12. The method of claim 8, additionally comprising the step of decrementing both counters when it is determined that the sum of the phase differences minus twice a constant angle is not within a predetermined second threshold.

13. The method of claim 3, in which the monitoring step comprises determining whether or not one phase difference minus a constant angle equals the other phase difference minus a constant angle.

14. The method of claim 3, in which the monitoring step comprises determining whether the sum of the phase differences is within a predetermined second threshold of twice a constant angle.

15. The method of claim 3, in which the monitoring step comprises determining whether the phase difference between the first and second signatures is greater than the phase difference between the third and fourth signatures.

16. The method of claim 1, additionally comprising the steps of:

incrementing a first counter periodically while the phase difference between the first and second signatures is greater than the phase difference between the third and fourth signatures, and incrementing a second counter periodically while the phase difference between the first and second signatures is not greater than the phase difference between the third and fourth signatures.

17. The method of claim 3, in which the monitoring step comprises determining whether or not the phase difference is within a predetermined threshold of a constant angle.

18. A monpulse radar receiver comprising;

means for forming sum and difference signals from a target return signal;

means for combining the sum and difference signals in phase quadrature to form a first vector signature signal;

means for combining the sum and difference signals in phase quadrature to form a second vector signature signal so that the phase difference between the first and second signature signals varies with the amplitude of the difference signal;

means for comparing the first and second signature signals to detect the phase difference therebetween;

means for combining the sum and difference signals in phase quadrature to form a third vector signature signal in which the difference signal is of opposite phase to the difference signal of the first signature signal;

means for combining the sum and difference signals in phase quadrature to form a fourth vector signature signal in which the difference signal is of opposite phase to the difference signal of the second signature signal, the phase difference between the third and fourth signature signals varying with the amplitude of the difference signal; and means for comparing the third and fourth signature signals to detect the phase difference therebetween.

19. The receiver of claim 18, in which the sum and difference signals of the first signature are both in phase with the sum and difference signals respectively of the second signature, the receiver additionally comprising:

means for monitoring the phase difference between the first and second signatures and the phase difference between the third and fourth signatures.

20. The receiver of claim 19 in which the monitoring means comprises:

first and second counters;

means for incrementing the first counter while the phase difference between the first and second signatures is greater than the phase difference between the third and fourth signatures; and means for incrementing the second counter while the phase difference between the first and second signatures is not greater than the phase difference between the third and fourth signatures.

21. The receiver of claim 20, in which the monitoring means additionally comprises means for decrementing both counters when the phase difference between the first and second signatures and the phase difference between the third and fourth signatures are not within a predetermined first threshold.

22. The receiver of claim 21, in which the monitoring means additionally comprises means for decrementing both counters when the phase difference between the first and second signature signals minus a constant value equals the phase difference between the third and fourth signature signals minus the constant value.

23. The receiver of claim 22, in which the monitoring means additionally comprises means for decrementing both counters when the sum of the phase differences minus twice the constant value is not within a predetermined second threshold.

* * * * *